US010389578B2

(12) United States Patent
Achtermann et al.

(10) Patent No.: US 10,389,578 B2
(45) Date of Patent: Aug. 20, 2019

(54) LEARNED RESPONSE FOR ALERTS

(71) Applicant: International Business Machines Corporation, Armonk, NY (US)

(72) Inventors: Jeffrey M. Achtermann, Austin, TX (US); Michael Bender, Rye Brook, NY (US); Timothy J. Hahn, Cary, NC (US); Hari H. Madduri, Austin, TX (US); Leucir Marin, Jr., Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 15/450,867

(22) Filed: Mar. 6, 2017

(65) Prior Publication Data
US 2018/0254961 A1   Sep. 6, 2018

(51) Int. Cl.
  *G06F 15/173* (2006.01)
  *H04L 12/24* (2006.01)
  *G06N 5/04* (2006.01)

(52) U.S. Cl.
  CPC ........ *H04L 41/0686* (2013.01); *H04L 41/069* (2013.01); *G06N 5/043* (2013.01)

(58) Field of Classification Search
  CPC ....... H04L 43/04; H04L 43/106; H04L 12/26; G06N 99/005; G06N 99/00
  See application file for complete search history.

(56) References Cited

U.S. PATENT DOCUMENTS

| 5,734,697 A * | 3/1998 | Jabbarnezhad | H04M 3/08 370/241 |
| 7,262,690 B2 * | 8/2007 | Heaton | G08B 25/009 340/500 |
| 8,200,606 B2 * | 6/2012 | Lorge | G06N 5/04 706/47 |

(Continued)

OTHER PUBLICATIONS

Anonymously; "A system and method to prioritize alerts in anomaly detection systems"; http://ip.com/IPCOM/000245766D; Apr. 6, 2016.

(Continued)

*Primary Examiner* — Cheikh T Ndiaye
(74) *Attorney, Agent, or Firm* — North Shore Patents, P.C.; Michele Liu Baillie

(57) ABSTRACT

In a method for providing an automatic learned response in a network, a collection system observes user responses to the incoming system indicators and to parameter types and associated parameter values used in the user responses. The collection system creates alert event entries to includes the incoming system indicators, confidence thresholds, the user responses, and the parameter types and associated parameter values used in the user responses. When the collection system receives new system indicators, the collection system determines whether the new system indicators match the system indicators in one or more alert event entries. When the new system indicators match the system indicators in one or more alert event entries and the confidence level exceeds the confidence threshold, the collection system automatically creates a new response based on the user response, the parameter types, and the associated parameter values in the matching alert event entries.

17 Claims, 5 Drawing Sheets

(56) References Cited

U.S. PATENT DOCUMENTS

| | | | |
|---|---|---|---|
| 8,812,649 B2* | 8/2014 | Adams, Jr. | H04L 41/0659 709/224 |
| 2004/0111471 A1* | 6/2004 | Stoner | H04L 41/0681 709/204 |
| 2005/0038888 A1* | 2/2005 | Labertz | H04L 12/5601 709/224 |
| 2006/0074666 A1* | 4/2006 | Chung | G06N 5/047 704/257 |
| 2008/0143548 A1 | 6/2008 | Grimmelmann et al. | |
| 2013/0282562 A1 | 10/2013 | Gallo et al. | |
| 2014/0250224 A1 | 9/2014 | Ciszkowski et al. | |
| 2015/0029020 A1* | 1/2015 | Bailey | G08B 25/001 340/502 |

OTHER PUBLICATIONS

Anonymously; "Alert Management System for Handling Alert Fatigue"; retrieved from http://ip.com/IPCOM/000224904D; Jan. 10, 2013.

Anonymously; "Method for Smart Alerting Principle in SAN Environments"; retrieved from http://ip.com/IPCOM/000226269D; Mar. 26, 2013.

Boyle, R. et al.; "Event Monitoring and Incident Response"; SANS Institute InfoSec Reading Room; Mar. 22, 2013.

* cited by examiner

LEARNED RESPONSE FOR ALERTS

BACKGROUND

In many network environments, users are responsible for watching a variety of logs, messages, views, events, and other system indicators that alert users to the state of a system. Based on their interpretation of the information in the system indicators, the users can issue commands to create responses to address the alerts. Responding to alerts is thus labor intensive for the users. Although there exist types of system automations, these systems require users to codify the responses to incoming events or stimuli. The burden is still on the users to create the responses.

SUMMARY

Disclosed herein is a method for providing automatic learned responses for alerts and a computer program product as specified in the independent claims. Embodiments of the present invention are given in the dependent claims. Embodiments of the present invention can be freely combined with each other if they are not mutually exclusive.

According to an embodiment of the present invention, a method for providing an automatic learned response in a network by a collection system, includes: creating, by the collection system, alert event entries from observations of user responses to system indicators, each alert event entry comprising one or more system indicators, a user response to the one or more system indicators, and one or more parameter types and associated parameter values used in the user response; receiving one or more new system indicators by the collection system; determining, by the collection system, whether the one or more new system indicators match the one or more system indicators in one or more alert event entries; and when the one or more new system indicators match the one or more system indicators in one or more alert event entries, automatically creating, by the collection system, a new response based on the user response, the one or more parameter types, and the associated parameter values in the matching one or more alert event entries.

In one aspect of the present invention, the creating of the alert event entries includes: observing one or more incoming system indicators; determining that the one or more incoming system indicators does not match the one or more system indicators in any of the alert event entries; in response, forwarding the one or more incoming system indicators to a user for user processing; observing the new user response to the one or more incoming system indicators, the one or more parameter types, and the associated parameter values used in the new user response; and creating a new alert event entry to comprise the one or more incoming system indicators, the new user response, the one or more parameter types, and the associated parameter values used in the new user response.

In one aspect of the present invention, the automatically creating the new response includes: retrieving the user response in the matching one or more alert event entries; retrieving the one or more parameter types and the associated parameter values in the matching one or more alert event entries; determining a parameter value of each of the one or more parameter types in the matching one or more alert event entries for the new response; and automatically creating the new response based on the user response and the parameter value of each of the one or more parameter types in the matching one or more alert event entries.

DETAILED DESCRIPTION

Figure 1:
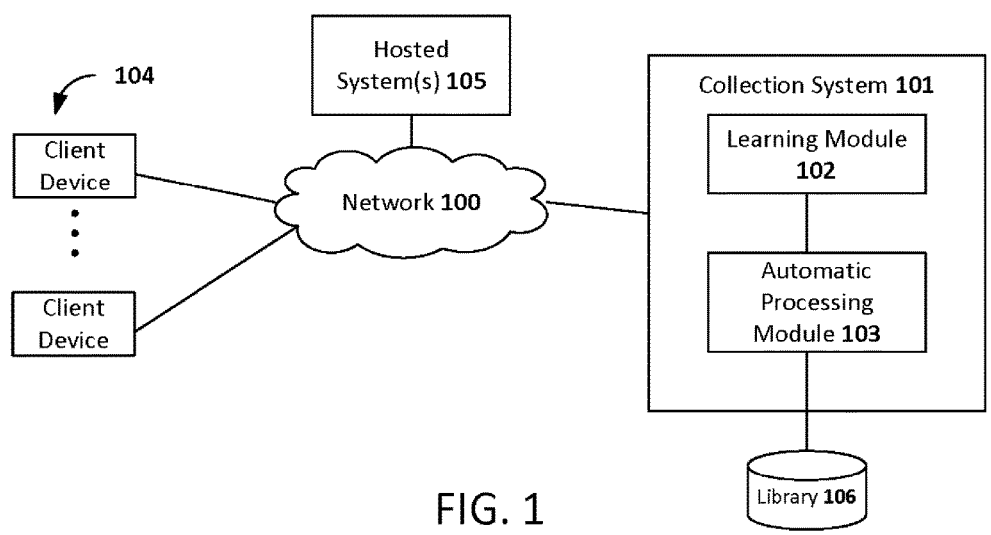
FIG. 1 illustrates an exemplary embodiment of a system for providing automatic learned responses for alerts according to the present invention.

FIG. 1 illustrates an exemplary embodiment of a system for providing automatic learned responses for alerts according to the present invention. The system includes a network 100 of client devices 104, one or more hosted systems 105 for providing network services to the client devices 104, a collection system 101, and a library 106 coupled to the collection system 101. the client devices 104 may be part of an Internet of Things (IoT) system that collects and exchanges data over the Internet. The collection system 101 includes a learning module 102 and an automatic processing module 103. The learning module 102 observes incoming system indictors, such as logs, messages, and/or events, from activities between the client devices 104 and the hosted system 105, or between the hosted systems 105. The learning module 102 of the collection system 101 learns from observing user response to the system indictors, and stores learned information in the library 106. The automatic processing module 103 uses the information stored in the library 106 to automatically, without user intervention, respond to system indictors. The learning module 102 and the automatic processing module 103 may operate in parallel. The functions of the collection system 101 and its components are described further below.

Figure 2:
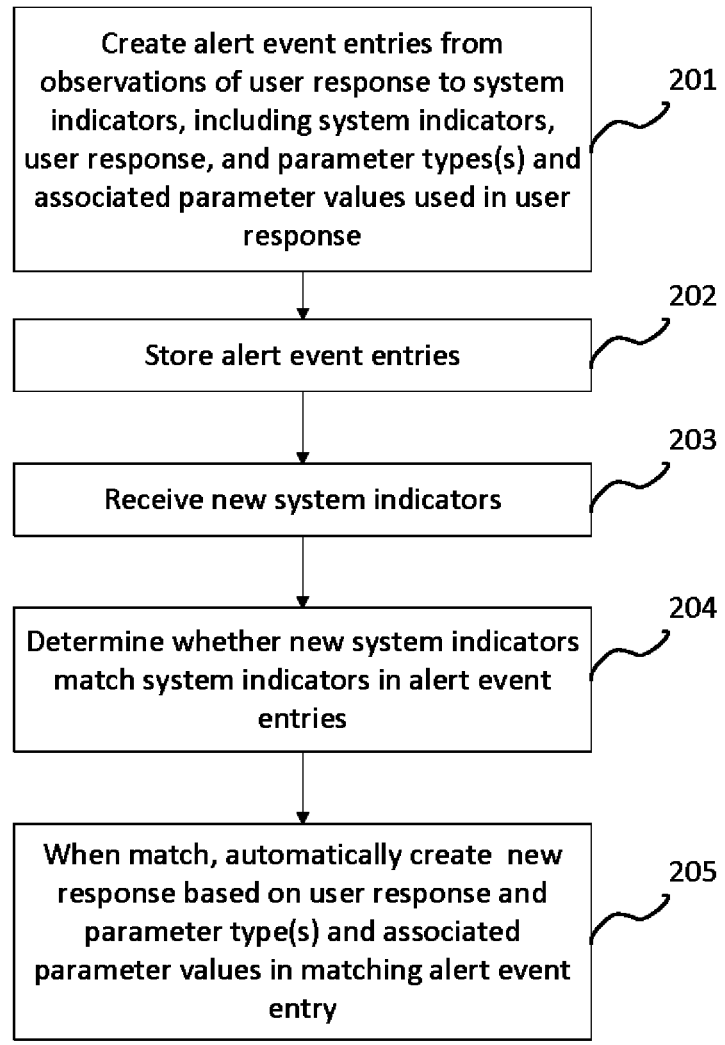
FIG. 2 illustrates an exemplary embodiment of a method for providing automatic learned responses for alerts according to the present invention.

FIG. 2 illustrates an exemplary embodiment of a method for providing automatic learned responses for alerts according to the present invention. The learning module 102 of the collection system 101 creates alert event entries from observations of user responses to system indicators (201). Each alert event entry includes the system indictors to which a user response addresses, the user response, and the parameter type(s) and associated parameter values used in the user response. The learning module 102 stores the alert event entries in the library 106 (202). When the learning module 102 receives new system indicators (203), the learning module 102 determines whether the new system indicators match the system indicators in any of the alert event entries in the library 106 (204). When a match is found, the automatic processing module 103 automatically, and without user intervention, creates a new response to the system indictors based on the user response and the parameter type(s) and associated parameter values in the matching alert event entry (205).

Figure 3:
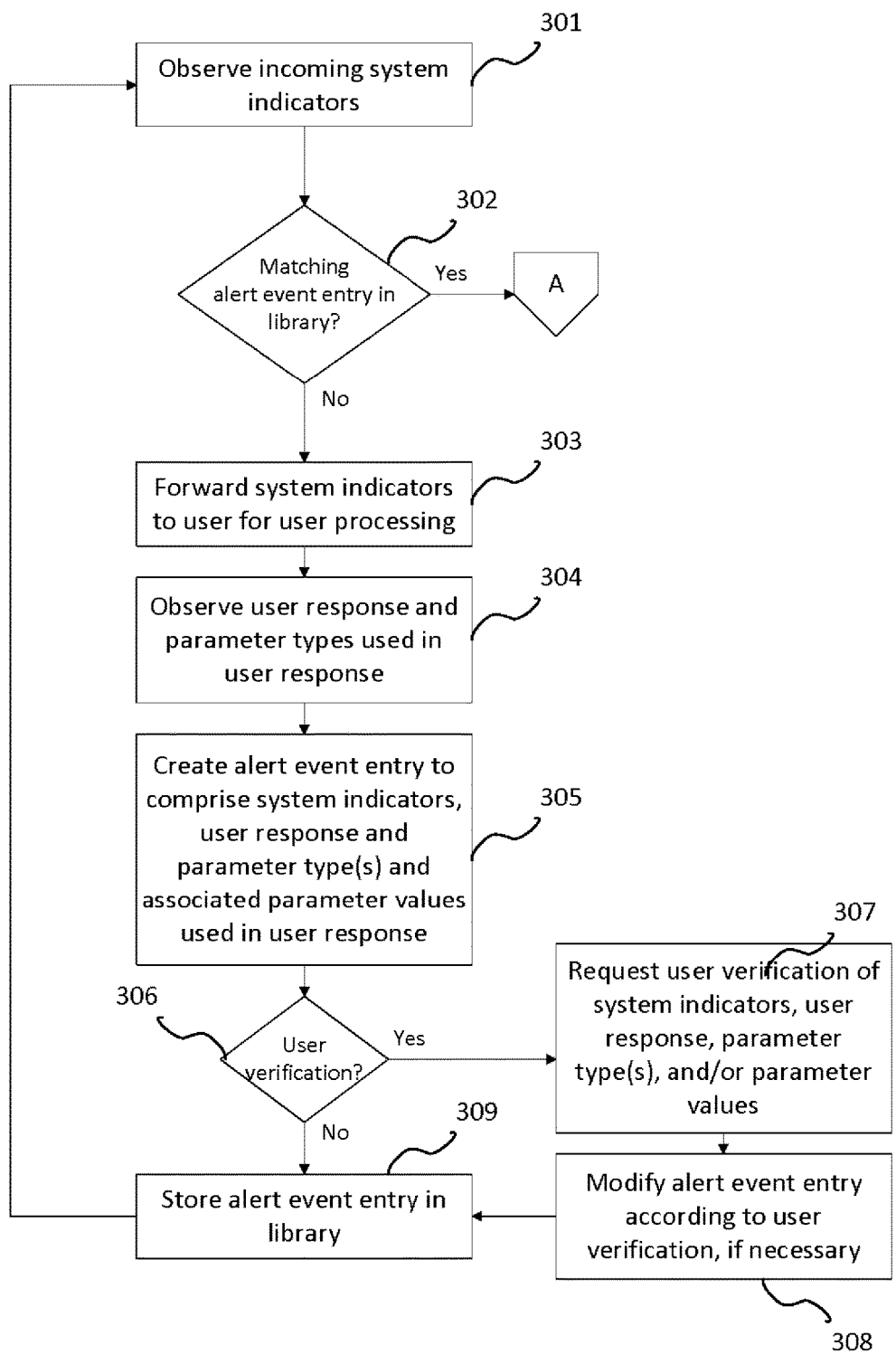
FIG. 3 illustrates in more detail exemplary functionalities of the learning module according to the present invention.

FIG. 3 illustrates in more detail exemplary functionalities of the learning module according to the present invention. The learning module 102 observes incoming system indicators, such as logs, messages, and/or events, from activities between the client devices 104 and the hosted system 105, or between the hosted systems 105 (301). The learning module 102 compares the incoming system indicators with the system indicators stored in the alert event entries in the library 106 (302). If the learning module 102 finds a match, then the incoming system indicators indicate an alert which the collection system 101 has previously observed, and the automatic processing module 103 handles the incoming system indicators, as described further below with reference to FIG. 4. The system indicators may be considered to "match" based on any combination of parameters, such as message type, a system ID, a system location, an IP address, etc. A combination or sequence of messages or set of messages may also be interpreted as an alert and stored in an alert event entry. The messages may be from different systems, where the combination of messages indicate a certain situation. In this case, the messages, as system indicators, may be considered to "match" to those stored in the alert event entry if they arrive within a certain time window or in a certain order. The collection system 101 may be configured to recognize other combinations of system indicators and/or parameter types as a "match".

If the learning module 102 fails to find a match, then the learning module 102 forwards the system indicators to a user for user processing (303). The learning module 102 then observes the user response to the system indicators and to the parameter types used in the user response (304). The user response may include one or more commands that include values for the parameter types that are appropriate for the system indicators. Examples of parameter types include, but are not limited to, a name, a client ID, a system ID, a system location, an IP address, an email address, data size, a timestamp, etc. The learning module 102 creates an alert event entry to comprise the system indicators, the user response, and the parameter type(s) and associated parameter values used in the user response (305). Optionally, the learning module 102 may request user verification of the system indicators, the user response, the parameter types, and/or the parameter values (306-307). The learning module 102 may receive confirmation from the user that the system indicators were the ones that the user used to identify the alert, or the learning module 102 may receive modifications on which system indicators were actually used. Similarly, the learning module 102 may receive either a confirmation or modification from the user concerning the user response, the parameter types, and/or the parameter values observed by the learning module 102. If modifications are received, then the learning module 102 modifies the alert event entry accordingly (308). The alert event entry is then stored in the library 106 (309). In this way, a library of system indictors and user responses is built over time, based on observations of user actions and adjustment/instruction from the user to teach the collection system 101 what actions to take in response to a specific stimulus.

Figure 4:
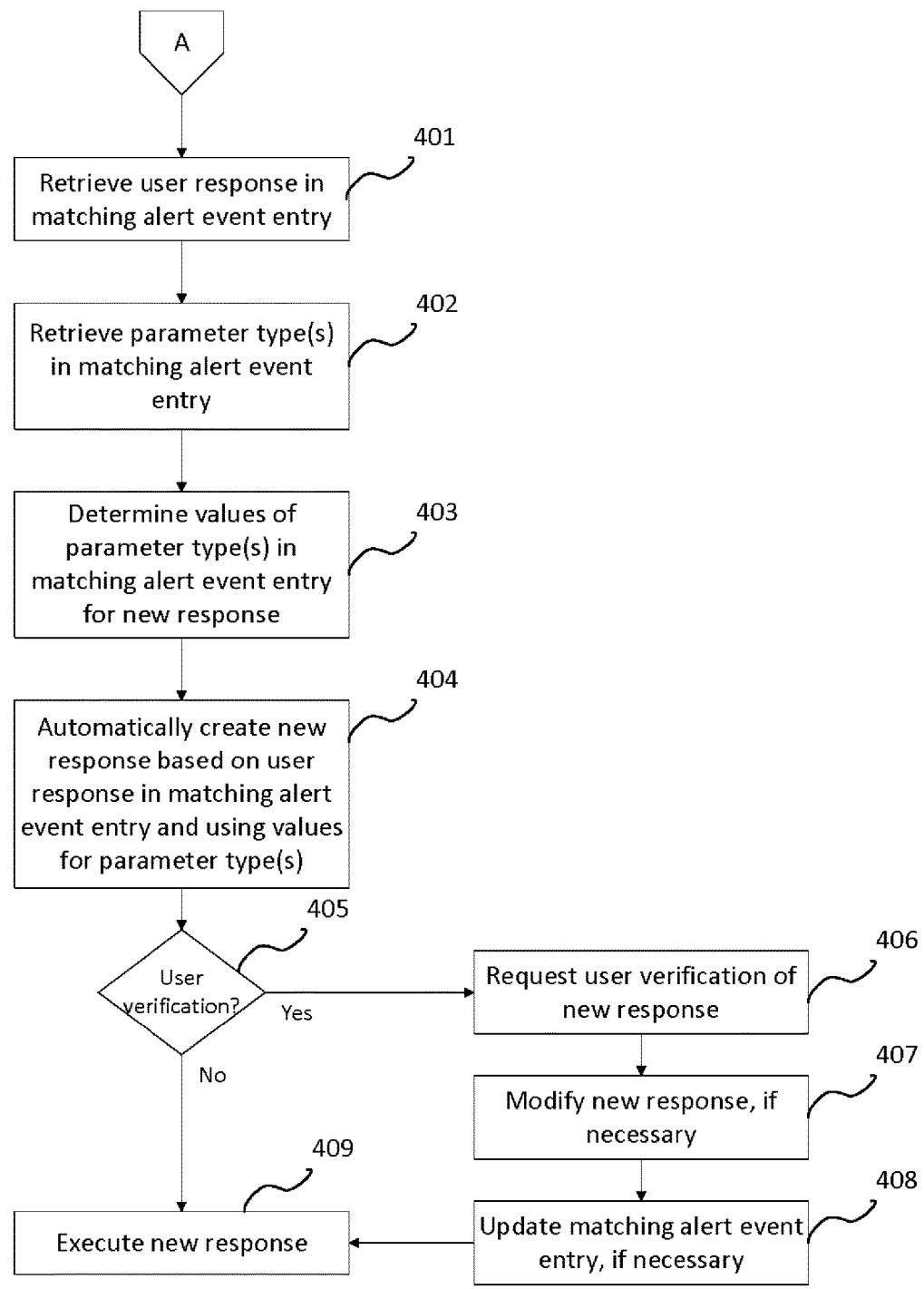
FIG. 4 illustrates in more detail exemplary functionalities of the automatic processing module according to the present invention.

FIG. 4 illustrates in more detail exemplary functionalities of the automatic processing module according to the present invention. When the learning module 102 compares the incoming system indicators with the system indicators stored in the alert event entries in the library 106 and finds a match (302, FIG. 3), the automatic processing module 103 retrieves the user response in the matching alert event entry (401), and retrieves the parameter type(s) in the matching alert event entry (402). The automatic processing module 103 then determines the values of the parameter types(s) for the new response (403). The automatic processing module 103 automatically, and without user intervention, creates a new response based on the user response in the matching alert event entry and using values for the parameter type(s) appropriate for the system indicators (404). More specifically, the automatic processing module 103 identifies the parametric parts of the system indicators using the parameter types in the matching alert event entry, formulates the parameter values for the parametric parts, and creates the new response to include these parameter values. Optionally, the new response may be defined or refined based on the parameter values formulated. For example, the parameter values may be a range of values, where one type of new response is generated if the parameter values are of a certain range and another type of new response is generated if the parameter values are of a different range. Optionally, the automatic processing module 103 may request user verification of the new response (405-406). The automatic processing module 103 may receive confirmation or modification of the new response from the user. If a modification is received, then the automatic processing module 103 modifies the new response accordingly (407). The automatic processing module 103 can also update the matching alert event entry according to the user feedback (408). In this manner, the collection system 101 can continually learn from observations of user actions. The new response is then executed (409). Optionally, a confidence threshold can be configured for an alert event entry, which defines a level of confidence for the association of the user response with system indicators in the alert event entry. Based on user feedback or negative results from the execution of the user response, the collection system 101 can raise the confidence threshold that is to be met prior to generating the user response according to a matching alert event entry. The confidence level can further be used to determine whether user verification is to be sought for a new response. For example, user verification can be sought when the confidence level for the new response falls below a configured confidence threshold. Adjustments to alert event entries can then be made according to the user verification. As the collection system 101 modifies or refines the alert event entry, the confidence threshold of the alert event entry may be increased. Over time, this may result in fewer responses being sent for user verification.

For example, assume that an alert event entry was created and stored for a message stating that a system storage will run out of space at midnight on Thursday. Assume that the message includes a system ID, a storage ID, a data size (for the amount of data on the storage), and a timestamp (for the time storage will run out), the values of which are used in formulating the user response. The message type (i.e., a system storage will run out of storage space), the user response, and the parameter types are stored in the alert event entry. Further assume that the learning module 102 observes a new message of this message type with different values for the parameter types. The learning module 102 matches the message type of the new message to the message type in the alert event entry (302, FIG. 3). Instead of sending the new message to the user for user processing, the learning module 102 sends the new message to the automatic processing module 103. The automatic processing module 103 retrieves the user response from the matching alert event entry (401). The automatic processing module 103 also retrieves the system ID, storage ID, data size, and timestamp parameter types from the matching alert event entry (402). The automatic processing module 103 then determines the values for the system ID, storage ID, data size, and timestamp parameter types for the new response (403), using the parameter values for the system ID, storage ID, data size, and timestamp from the received message to calculate/formulate the values, and creates a new response to the new message based on the user response in the matching alert event entry and using the values determined in step 403 (404). The new response is then executed (409).

A second example involves the observation of two messages which, together, signify a situation that a user normally responds to. Consider a message received from system A indicating "unable to communicate with SystemB". The learned automated response that may be applied is "Retry communication with System B". Likewise, when a message is received from system B indicating "unable to communicate with SystemA", the automated response might be "Retry communication with System A". However, there may be a $3^{rd}$ condition (indicator set) that is checked. This third indicator checks to see if both alerts occurred within a short (configuration parameter) interval of time, and if yes, it seeks user verification. The observed user response may be the issuance of a command to a communications networking environment to "enable communications between SystemA and SystemB". This response behavior is learned by the system 101 over a period of time and the confidence level associated with the response increases gradually. Once the confidence level is above the confidence threshold, the system 101 automatically sends this response to enable communication between Systems A and B. The alert event entry would consider the situation occurring if the observed messages arrived in any order (within the defined interval of time), pulling the system ID values from those incoming events for use in formulating the automated response. The response would be sent to another part of the computing environment, and be constructed using the parameter values from the observed messages which signified the situation.

Optionally, the automatic processing module 103 may be configured to operate in different modes. The modes may include, but are not limited to, a fully automated mode where new responses are created and executed without any user input or notification, a notification mode where new response are created and executed and the user is then notified, a companion mode where user verification of the new response is requested prior to execution as described above, and an advising mode where the new response is recommended to the user but not created or executed by the automatic processing module 103. The mode in which the automatic processing module 103 operates may be set by an administrator and/or preconfigured according to a set of rules.

Figure 5:
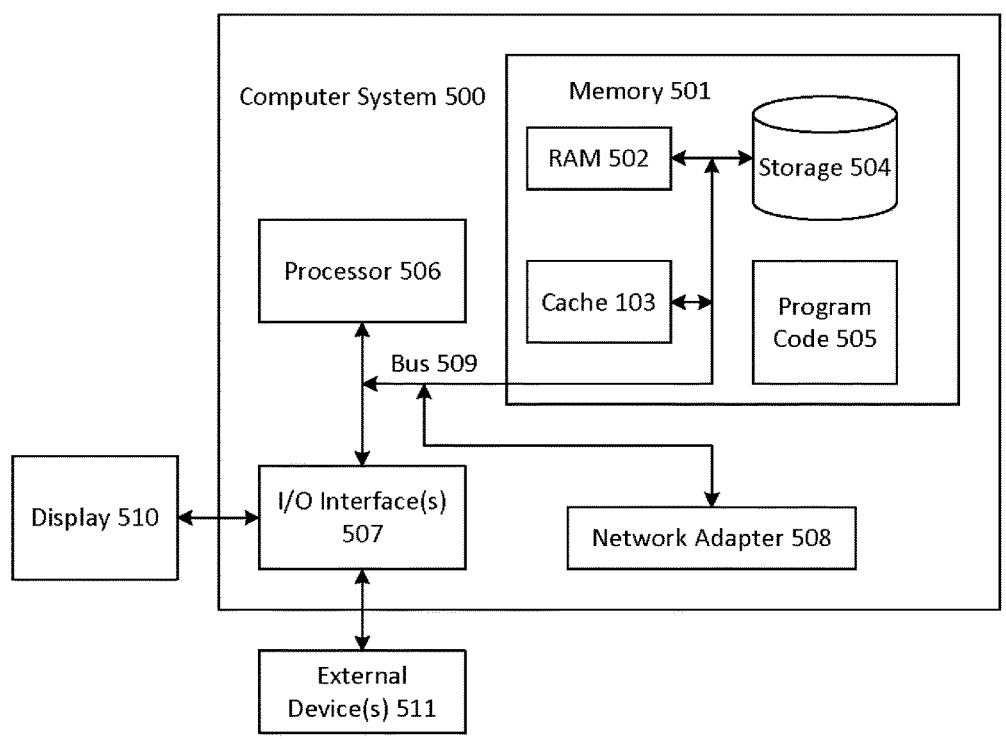
FIG. 5 illustrates a computer system for implementing the exemplary embodiments according to the present invention.

FIG. 5 illustrates a computer system for implementing the exemplary embodiments according to the present invention. The computer system 500 may be implemented as the host systems 105 and/or the collection system 101. The computer system 500 is operationally coupled to a processor or processing units 506, a memory 501, and a bus 509 that couples various system components, including the memory 501 to the processor 506. The bus 509 represents one or more of any of several types of bus structure, including a memory bus or memory controller, a peripheral bus, an accelerated graphics port, and a processor or local bus using any of a variety of bus architectures. The memory 501 may include computer readable media in the form of volatile memory, such as random access memory (RAM) 502 or cache memory 503, or non-volatile storage media 504. The memory 501 may include at least one program product having a set of at least one program code module 505 that are configured to carry out the functions of embodiment of the present invention when executed by the processor 506. The computer system 500 may also communicate with one or more external devices 511, such as a display 510, via I/O interfaces 507. The computer system 500 may communicate with one or more networks via network adapter 108.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing an automatic learned response in a network by a collection system, comprising:
    observing, by the collection system, a plurality of system indicators from activities between a plurality of client devices or host systems;
    observing, by the collection system, a plurality of user responses executed to address the plurality of system indictors, each user response comprising one or more parameter types and associated parameter values;
    creating, by the collection system, a plurality of alert event entries for the plurality of user responses, wherein a given alert event entry of the plurality of alert event entries comprises a given user response of the plurality of user responses executed to address one or more system indicators of the plurality of system indicators, the one or more system indicators, and given one or more parameter types and given associated parameter values used in the given user response;
    receiving one or more new system indicators by the collection system;
    determining, by the collection system, whether the one or more new system indicators match the one or more system indicators in the given alert event entry;
    when the one or more new system indicators match the one or more system indicators in the given alert event entry, automatically creating, by the collection system, a new response based on the given user response, the given one or more parameter types, and the given associated parameter values in the given alert event entry; and
    executing, by the collection system, the new response.

2. The method of claim 1, wherein the creating of the given alert event entry further comprises:
    requesting user verification of the one or more incoming system indicators, the given user response, the given one or more parameter types, or the given associated parameter values used in the given user response; and
    modifying the given alert event entry according to the user verification.

3. The method of claim 1, wherein the automatically creating the new response comprises:
    retrieving the user response in the given alert event entry;
    retrieving the given one or more parameter types and the given associated parameter values in the given alert event entry;
    determining a parameter value of each of the given one or more parameter types in the given alert event entry for the new response; and
    automatically creating the new response based on the given user response and the given one or more parameter values of the given one or more parameter types in the given alert event entry.

4. The method of claim 3, wherein the automatically creating of the new response comprises:
    identifying parametric parts of the one or more new system indicators using the given one or more parameter types in the given alert event entry;
    formulating a new parameter value for each of the parametric parts; and automatically creating the new response to comprise the new parameter values for each of the parametric parts.

5. The method of claim 1, wherein the given alert event entry is configured with a confidence threshold, wherein the automatically creating the new response further comprises:
   determining a confidence level for an association of the new user response with the system indicators in the given alert event entry;
   determining whether the confidence level is below the confidence threshold;
   when the new confidence level is below the confidence threshold, requesting user verification of the new response; and
   modifying the new response according to the user verification.

6. The method of claim 5, wherein the automatically creating the new response further comprises:
   updating the confidence threshold configured with the given alert event entry according to the user verification.

7. A computer program product for providing an automatic learned response in a network, the computer program product comprising a computer readable storage medium having program instructions embodied therewith, the program instructions executable by one or more processors to cause the one or more processors to:
   observe a plurality of system indicators from activities between a plurality of client devices or host systems;
   observe a plurality of user responses executed to address the plurality of system indictors, each user response comprising one or more parameter types and associated parameter values;
   create a plurality of alert event entries for the plurality of user responses, wherein a given alert event entry of the plurality of alert event entries comprises, a given user response of the plurality of user responses executed to address one or more system indicators of the plurality of system indicators, the one or more system indicators, and given one or more parameter types and given associated parameter values used in the given user response;
   receive one or more new system indicators;
   determine whether the one or more new system indicators match the one or more system indicators in the given more alert event entry;
   when the one or more new system indicators match the one or more system indicators in the given alert event entry, automatically create a new response based on the given user response, the given one or more parameter types, and the given associated parameter values in the given one or more alert event entry; and
   execute the new response.

8. The computer program product of claim 7, wherein the creating of the given alert event entry further comprises:
   request user verification of the one or more incoming system indicators, the given user response, the given one or more parameter types, or the given associated parameter values used in the given user response; and
   modify the given alert event entry according to the user verification.

9. The computer program product of claim 7, wherein the automatically creating the new response comprises:
   retrieve the user response in the given alert event entry;
   retrieve the given one or more parameter types and the given associated parameter values in the given alert event entry;
   determine a parameter value of each of the given one or more parameter types in the given alert event entry for the new response; and
   automatically create the new response based on the given user response and the given one or more parameter values of the given one or more parameter types in the given alert event entry.

10. The computer program product of claim 7, wherein the given alert event entry is configured with a confidence threshold, wherein the automatically creating the new response further comprises:
    determine a confidence level for an association of the new user response with the system indicators in the given alert event entry;
    determine whether the confidence level is below the confidence threshold;
    when the confidence level is below the confidence threshold, request user verification of the new response; and
    modify the new response according to the user verification.

11. The computer program product of claim 10, wherein the automatically creating the new response further comprises:
    update the confidence threshold configured with the given alert event entry according to the user verification.

12. The computer program product of claim 7, wherein the automatically creating of the new response comprises:
    identify parametric parts of the one or more new system indicators using the given one or more parameter types in the given alert event entry;
    formulate a new parameter value for each of the parametric parts; and
    automatically create the new response to comprise the new parameter values for each of the parametric parts.

13. A system, comprising:
    one or more processors; and
    a computer readable storage medium having program instructions embodied therewith, the program instructions executable by one or more processors to cause the one or more processors to:
    observe a plurality of system indicators from activities between a plurality of client devices or host systems;
    observe a plurality of user responses executed to address the plurality of system indictors, each user response comprising one or more parameter types and associated parameter values;
    create a plurality of alert event entries for the plurality of user responses, wherein a given alert event entry of the plurality of alert event entries comprises a given user response of the plurality of user responses executed to address one or more system indicators of the plurality of system indicators, the one or more system indicators, and given one or more parameter types and given associated parameter values used in the given user response;
    receive one or more new system indicators;
    determine whether the one or more new system indicators match the one or more system indicators in the given alert event entry;
    when the one or more new system indicators match the one or more system indicators in the given alert event entry, automatically create a new response based on the given user response, the given one or more parameter types, and the given associated parameter values in the given alert event entry; and
    execute the new response.

14. The system of claim 13, wherein the creating of the given alert event entry further comprises:
   request user verification of the one or more incoming system indicators, the given user response, the given one or more parameter types, or the given associated parameter values used in the given user response; and
   modify the given alert event entry according to the user verification.

15. The system of claim 13, wherein the automatically creating the new response comprises:
   retrieve the user response in the given alert event entry;
   retrieve the given one or more parameter types and the given associated parameter values in the given alert event entry;
   determine a parameter value of each of the given one or more parameter types in the given alert event entry for the new response; and
   automatically create the new response based on the given user response and the given one or more parameter values of the given one or more parameter types in the given alert event entry.

16. The system of claim 15, wherein the automatically creating of the new response comprises:
   identify parametric parts of the one or more new system indicators using the given one or more parameter types in the given alert event entry;
   formulate a new parameter value for each of the parametric parts; and
   automatically create the new response to comprise the new parameter values for each of the parametric parts.

17. The system of claim 13, wherein the given alert event entry is configured with a confidence threshold, wherein the automatically creating the new response further comprises:
   determine a confidence level for an association of the new user response with the system indicators in the given alert event entry;
   determine whether the confidence level is below the confidence threshold;
   when the confidence level is below the confidence threshold, request user verification of the new response; and
   modify the new response according to the user verification.

* * * * *